May 19, 1953 — D. K. SANDERSON — 2,638,952
COLLAPSIBLE SCRUB BUCKET
Filed April 29, 1950 — 2 Sheets-Sheet 1
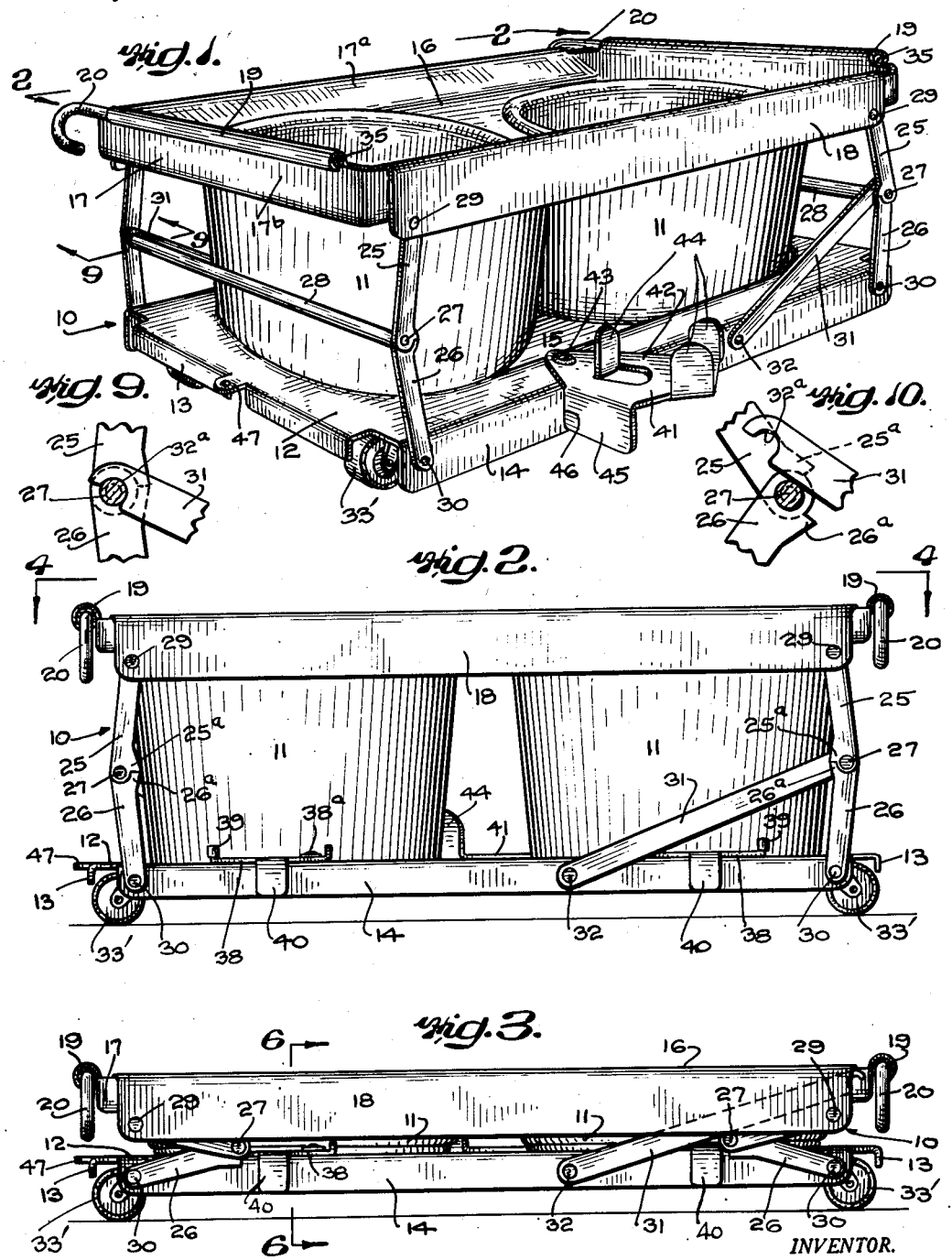
INVENTOR.
DORIS K. SANDERSON
BY Lew Edelson
ATTORNEY May 19, 1953 D. K. SANDERSON 2,638,952
COLLAPSIBLE SCRUB BUCKET
Filed April 29, 1950 2 Sheets-Sheet 2
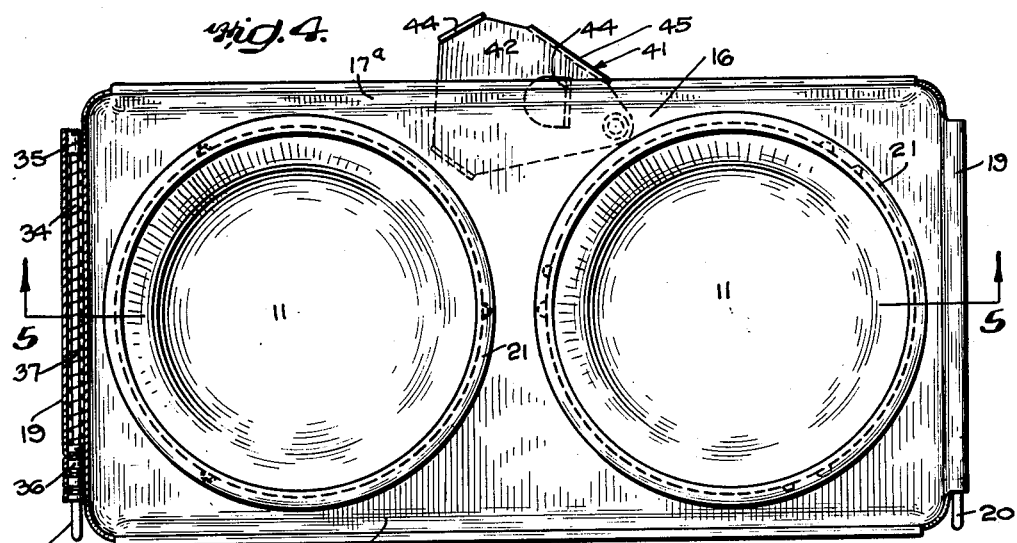
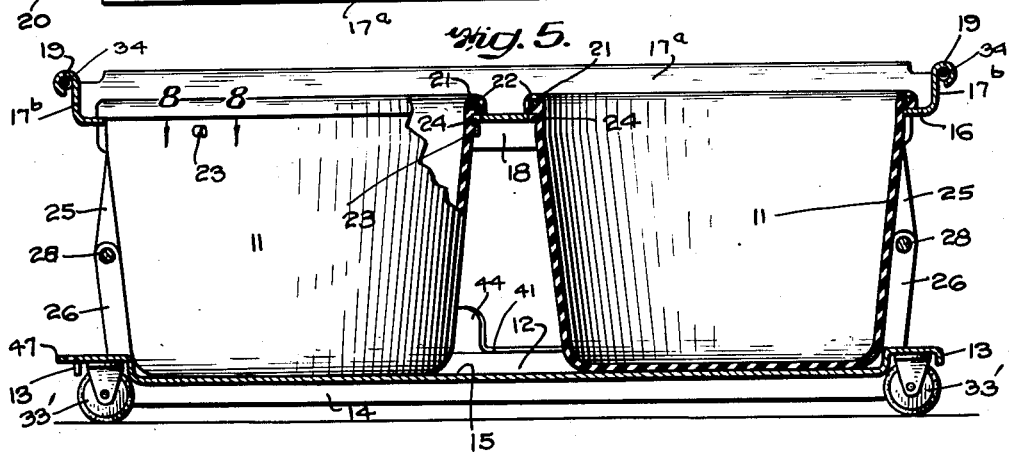
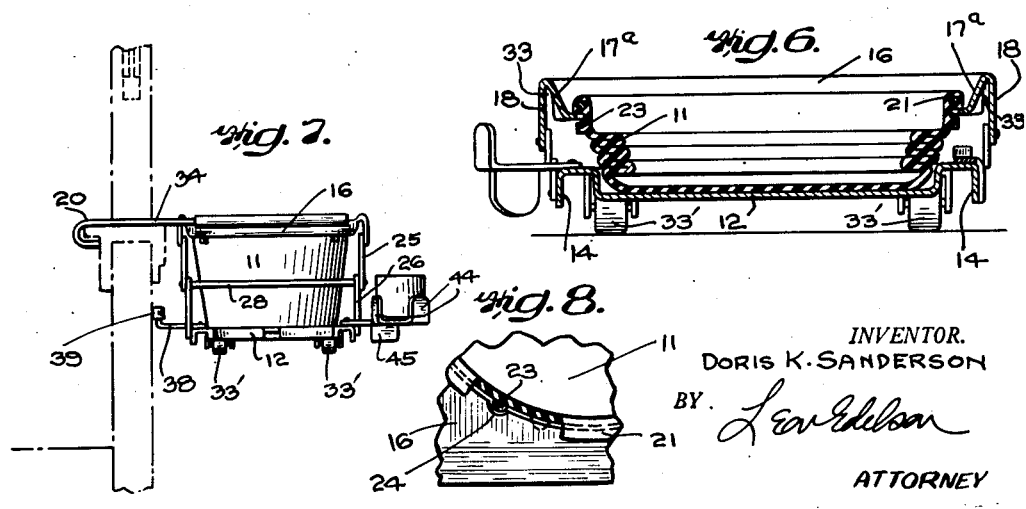
INVENTOR.
DORIS K. SANDERSON
BY Leon Edelson
ATTORNEY Patented May 19, 1953

2,638,952

UNITED STATES PATENT OFFICE 2,638,952

COLLAPSIBLE SCRUB BUCKET

Doris K. Sanderson, Rochester, N. Y.

Application April 29, 1950, Serial No. 158,971

4 Claims. (Cl. 150—49)

This invention relates generally to apparatus for facilitating the use of scrub-buckets and the like and more particularly to an improved construction of a scrub-bucket assembly which is of relatively small and compact design, which is readily portable, which is adapted to conveniently transport the necessary cleaning fluids and materials to the place of their use, and which is readily collapsed when not in use to facilitate its storage in any out-of-the-way small space.

Among the principal objects of the present invention is to provide a scrub-bucket assembly which basically includes a wheeled supporting frame for a pair of collapsible tubs, the frame being collapsible into the form of a compact, readily transportable unit and the tubs being so operatively associated with the frame that upon collapse of the frame the tubs are automatically compacted within the confines of the collapsed frame. Conversely, when the frame is expanded into its fully extended open condition, the tubs are automatically expanded to form vessels of ample capacity for receiving the necessary cleaning liquids.

Still another and important object of the present invention is to provide a wheeled collapsible frame for a pair of flexible liquid-receiving tubs which are respectively so removably mounted in the frame that the latter serves as a transporting dolly for the tubs when filled with water or other cleaning liquid, the tubs being individually removable from their supporting frame for any desired change or replenishing of the liquid therein.

A still further object of the invention is to provide a transportable scrub-bucket assembly of the character aforesaid wherein is provided means for supporting the assembly from a window sill or the like, as well as means for receiving and holding in convenient position for use a can of cleanser or scouring powder or the like, these auxiliary means being respectively retractible for disposition within the confines of the frame when the assembly is collapsed into compact form for storage while not in use.

Other objects and advantages of the invention, relating to details of construction and economies effected by and through use of the invention, will appear more fully hereinafter, it being understood that the present invention consists substantially in the combination, construction, location and relative arrangement of parts, all as described in detail hereinafter, as shown in the accompanying drawings and as finally pointed out in the appended claims.

In the accompanying drawings which are illustrative of a preferred form and construction of the invention—

Figure 1 is a perspective view of the scrub-bucket assembly as constructed in accordance with and embodying the principles of the present invention;

Figure 2 is a side elevational view of the expanded unit shown in Figure 1;

Figure 3 is a side elevational view of the unit as it appears when collapsed for storage;

Figure 4 is a top plan view of the unit shown in Figure 1;

Figure 5 is a sectional view as taken along the line 5—5 of Figure 4;

Figure 6 is a transverse sectional view as taken along the line 6—6 of Figure 3;

Figure 7 is an end elevational view of the expanded unit showing the same operatively attached to a window sill;

Figure 8 is a partial section view of a detail of construction, said view being taken along the line 8—8 of Figure 5;

Figure 9 is a detail view on a somewhat enlarged scale of the brace as viewed from the line 9—9 of Figure 1 for locking the frame in its expanded operative form; and Figure 10 is a view corresponding to that of Figure 9 but showing the locking brace disengaged from its frame-locking position.

Referring now more particularly to the drawings, it will be observed that the apparatus of the present invention generally comprises a collapsible frame designated generally by the reference numeral 10 for supporting a pair of liquid-receiving tubs 11—11, these latter being formed of any suitable flexible and waterproof material, such as, rubber, plastic or the like, so as to render them each readily collapsible from its fully extended form shown in Figures 1, 2 and 5 into its collapsed form shown in Figure 6.

The supporting frame 10 for the collapsible liquid-receiving tubs 11—11 includes a bottom member 12 of generally rectangular form, preferably stamped of sheet metal and provided along its perimetral edges with depending reinforcing flanges 13—13 and 14—14. Preferably, the central portion of the member 12 is depressed, as at 15, to provide a common seat for the bottom ends of the tubs 11—11, the recess 15 serving also to receive any liquid that may drip from a brush or rag momentarily laid upon the top surface of the bottom member 12 in the vicinity of the tubs 11—11.

In addition to the bottom member 12, the tub supporting frame includes a top member 16 which is also suitably stamped of sheet metal, this top member being generally in the form of a shallow tray of a rectangular size approximating that of the bottom member 12. The top member 16 is provided with a perimetrally continuous upwardly projecting flange 17 forming a raised wall to retain within the confines of the member 16 any liquid that may splash out of the open tops of the tubs 11—11. Preferably, the longitudinally extending raised side walls 17ª—17ª of the top member 16 are respectively downwardly and inwardly inclined, as shown, these longitudinally extending side walls being each provided with a depending external flange 18. The opposed end walls 17ᵇ—17ᵇ of the top member are each provided along their upper edges with a rolled portion 19 forming a tubular socket for the retractable hanger hook 20 to be referred to more fully hereinafter. Formed in the horizontally disposed body portion of the top member 16 are a pair of circular openings through which are adapted to be projected the tubs 11—11.

These tubs 11—11 are each provided at their upper edges with a peripheral supporting rim or bead 21, such rim or bead being in each instance suitably reinforced by an internal wire or like element 22 molded or otherwise suitably incorporated within the rim or bead. The rim or bead 21 projects radially outwardly from the upper marginal edge of the tub to form an annular shoulder which is adapted to rest upon the marginal edge of the opening formed in the top member 16, each tub being suspended by its shoulder rim from the top member 16.

In order to lock the tubs against vertical displacement from the member 16, each of the tubs 11—11 is provided with a plurality of circumferentially spaced lugs 23 preferably formed as integral outwardly projecting elements of the tub. In the form shown each tub is provided with three of such integrally formed lugs, all of which are spaced from the tub-supporting rim 21 a distance just sufficient to permit the lugs to underlie the bottom surface of the supporting member 16 when the rim 21 of the tub is in supporting engagement with the upper surface of the member 16. The tub-receiving openings are each provided with circumferentially spaced notches 24 corresponding in number and spacing with the number and spacing of the lugs on a given tub, the several lugs on a tub being adapted to register with the notches for projection therethrough when the tub is vertically inserted into its opening in the member 16. Upon subsequent rotation of the tub in either direction to present the several lugs 23 out of registry with the notches 24, the tub will be held securely locked to the member 16 to prevent its axial displacement therefrom when the apparatus is in use with the tubs fully expanded, or when the apparatus is collapsed and stored away with the tubs in their compressed condition, as shown in Figure 6.

The tubs 11—11 are respectively designed to more or less snugly fit within their respective openings therefor formed in the member 16. Preferably, the supporting rims for the tubs are formed of a suitably compressible material, such as relatively soft rubber, so that as soon as the tubs are partially filled with water or other cleansing liquid the weight of the latter is sufficient to effect a water-tight seal between the upper rim of the tub and the surface of the member 16 which is engaged by the rim, thereby preventing seepage of any liquid from the upper surface of the member 16 downwardly along the outer surface of the tubs supported thereby.

The members 12 and 16 are normally disposed in spaced substantially parallel relation, the spacing therebetween when the apparatus is expanded for use being such as to permit the tubs 11—11 to be fully extended. In order to maintain the desired parallel relationship between the top and bottom members of the tub-supporting frame when the latter is either in its expanded condition or in its collapsed condition, the said members are interconnected at each of their corresponding corners by a toggle joint consisting of a pair of links 25 and 26 which are hingedly connected together, as at 27, upon the reduced end of a hinge pin 28. The outer extremity of the upper link 25 is hinged, as at 29, to a depending side flange 18 of the top member 16, while the outer extremity of the link 26 is hinged, as at 30, to a side flange 14 of the bottom member 12.

The toggle joints at each end of the apparatus are connected together for paired, conjoint actuation thereof by the hinge pin 28, it being noted that one such hinge pin is provided at each end of the apparatus. These hinge pins 28 serve not only as actuating members for the paired toggle joints, but also as opposed handles for conveniently lifting and carrying the apparatus from one place to another. The hingedly connected inner extremities of the links 25 and 26 of each toggle joint are respectively provided with interengaging projections 25ª and 26ª which are designed to abut one another when the joint is pressed into its fully opened condition, as shown in Figures 1 and 2, to maintain the top and bottom members 12 and 16 in spaced parallel relation, the paired joints being retained in their extended condition by a locking brace 31 hingedly connected, as at 32, to a side flange 14 of the bottom member 12. One such brace 31 is provided for each of the paired toggle joints, the outer free extremity of each brace 31 being notched, as at 32ª, for interlocking engagement with its corresponding hinge pin 28.

When the braces 31—31 are respectively disengaged from their associated hinge pins 28, the latter are each free to be shifted inwardly of the opposite ends of the apparatus to break the paired toggle joints and so effect collapse of the apparatus into its folded, compact condition, as shown in Figures 3 and 6. During this operation of breaking the paired toggle joints the braces 31—31 are free to ride over the top of their respectively associated hinge pins 28—28, as shown in Figures 3 and 10. When it is desired to expand the apparatus into its open condition so as to ready it for use, it is merely necessary to pull the hinge pins outwardly of the opposite ends of the apparatus, whereby each pin then operates to open its interconnected pair of toggle joints, each hinge pin being then locked in its outwardly shifted position by interengagement therewith of its associated brace 31. With the braces respectively interlocked with their associated hinge 28, as shown in Figures 1 and 2, the apparatus is securely held in expanded operative condition, with all parts thereof rigidly stabilized. When the paired toggle joints are broken and the unit collapsed, as shown in Figures 3 and 6, the free outer portions of the braces 31—31 are respectively snugly received within the downwardly presenting channels 33—33 of which the outer walls are the depending side flanges 18—18. In order to impart mobility to the unit so that it may be readily shifted about the floor when the apparatus is in use, the bottom member 12 is suitably fitted at each corner thereof with a swivel mounted caster wheel 33', these caster wheels being each adapted for free rotation about a 360 degree circle.

In certain instances it may be desirable to suspend the apparatus from a window sill or the like, as when it is desired to clean the windows, walls and other adjoining vertical surfaces, for which purpose the apparatus is equipped with the extensible hook-shaped members 20—20. These members 20—20 are each provided with an elongated stem 34, which is telescopically received within the tubular socket 19 formed at each end of the top member 16. The inner end of the stem 14 of each member 20 is provided with an enlargement 35, while the forward end of the socket 19 receiving the stem is fitted with a tubular sleeve 36 which serves as a guide for the stem as it is axially shifted relatively to its socket 19. The sleeve 36 is suitably fixed in the outer end of the socket, as by crimping the same therein, as shown in Figure 4, this sleeve 36 so fixed serving then as an outer abutment preventing full withdrawal of the member 20 from its associated socket 19. A coiled compression spring 37, arranged in embracing relation with respect to the stem 34 of each member 20 with its opposite ends respectively in engagement with the enlargement 35 at the inner end of the stem and the guide sleeve 36 at the outer end of the socket 19, provides the member 20 with a spring bias tending normally to maintain the member 20 retracted in its socket 19.

When it is desired to suspend the apparatus upon a window sill, as shown in Figure 7, the hook members 20—20 are each outwardly extended to permit their hooked extremities to engage over the outer edge of the window sill, as shown, with the extended portions of the stems 34 of the hook members resting upon the top surface of the sill to thereby support the apparatus in its elevated position. Preferably, the hooked extremities of the members 20—20 are rubber covered.

In order to insure requisite stability of the apparatus when supported by its hook members 20—20, as shown in Figure 7, it is preferably provided with a pair of members 38—38 respectively pivotally secured to the top surface of the bottom member 12, as at 38ª, for swinging movement in a horizontal plane outwardly of the longitudinal side edge of the member 12. The free end of each brace 38 is provided with a rubber covered projection 39 which, when the lever is extended outwardly substantially at right angles to the flange 14, is adapted to engage the wall beneath the window sill, all as most clearly shown in Figure 7. Preferably, the braces 38—38 are each provided intermediate their lengths with a downturned lug 40 which is adapted to engage flatwise against the outer face of the flange 14 to limit inward swinging movement of the brace 38.

Mounted upon the bottom member 12 upon the side thereof opposite that to which the braces 38—38 are pivotally mounted is a support or holder 41 for a can of scouring powder or the like. This holder 41 is suitably stamped of sheet metal to provide a horizontally disposed can supporting body member 42, which is pivotally secured, as at 43, to the upper surface of the bottom member 12 of the apparatus. The body member 42 of the can holder is provided with a plurality of upstanding lugs 44 spaced approximately 120 degrees apart to peripherally engage the bottom of a can supported upon the holder 42. Preferably, the holder is further provided with a depending flange 45, which is adapted for disposition flatwise against the longitudinally extending side flange 14 of the bottom member 12 of the apparatus to limit inward swinging movement of the can holder relatively to its support. This flange 45 constitutes a strengthening brace for the can holder when the latter is extended as shown in Figure 1. The inner vertical edge 46 of this depending flange serves to limit outward swinging movement of the can holder, this edge 46 being engageable with the flange 14 to brace the can holder when it is swung into its position shown in Figure 1.

It will be noted that all of the relatively moveable parts of the apparatus are designed to be disposed within the external confines of the apparatus whenever such parts are not intended to be placed in use. Thus, when the apparatus is collapsed for storage it is devoid of all projecting parts which may be accidentally engaged to dislodge it from its stored position.

If desired, the bottom member 12 may be fitted at one end thereof with an apertured projection 47 by means of which the collapsed apparatus may be conveniently hung upon a hook and which serves also to detachably receive, if desired, a handle (not shown) for moving the apparatus about the floor. Also, if desired, the apparatus may be provided with any suitable latching means (not shown) to releasably interlock the top and bottom members 12 and 16 when the apparatus is collapsed as shown in Figures 3 and 6.

While the apparatus of the present invention has been described as particularly adapted for use as a collapsible scrub-bucket assembly, it will be apparent that it is capable of other uses. For example, it may be employed as a collapsible laundry tub assembly, and it will be understood accordingly that it is not intended to limit the present invention to any specific use.

It will be understood, also, that the apparatus of the present invention is susceptible of various changes and modifications which may be made from time to time without departing from the general principles or real spirit of the invention, and it is accordingly intended to claim the same broadly, as well as specifically, as indicated in the appended claims.

What is claimed as new and useful is:

1. A collapsible unit of the character described comprising a pair of substantially coextensive plate members arranged in vertically spaced, substantially parallel relation, the upper one of said members having an aperture therein providing an annular ledge for suspension of a tub from said apertured plate member, an open-topped flexible tub operatively disposed between said members and adapted to be expanded to receive a liquid when said members are spread apart and to be collapsed between said members when the latter are brought together, said tub having a beaded top edge which overlies said annular ledge and is adapted to be quick-releasably locked to said ledge, and means interconnecting said plate members for shifting the same toward and away from each other to effect collapse and expansion of said flexible tub therebetween, said interconnecting means including at each opposite end of the unit a pair of toggle joints and a transversely extending rod interconnecting the paired joints for commonly actuating the same, said rods serving as opposed carrying handles for the unit when it is expanded for use.

2. In a collapsible unit as defined in claim 1 wherein the apertured plate member extends laterally about the top edge of the tub suspended therefrom and is provided with a perimetrally continuous raised wall to confine therewithin any liquid splashed out of said tub.

3. In a collapsible unit as defined in claim 1 wherein the uppermost plate member is provided with a pair of apertures for respectively receiving a pair of said flexible tubs, both tubs being adapted for simultaneous collapse and expansion.

4. In a collapsible unit as defined in claim 1 wherein the lowermost plate member is imperforate and is provided with a depressed region adapted to serve as a seat for the closed bottom end of the tub releasably secured to and suspended from the upper plate.

DORIS K. SANDERSON.

References Cited in the file of this patent
UNITED STATES PATENTS

| Number | Name | Date |
|---|---|---|
| 269,625 | Blake | Dec. 26, 1882 |
| 702,650 | Hazen | June 17, 1902 |
| 1,108,615 | Paul | Aug. 25, 1914 |
| 1,136,802 | Holloman | Apr. 20, 1915 |
| 1,161,336 | Potucek | Nov. 23, 1915 |
| 1,553,589 | Bargeron | Sept. 15, 1925 |
| 1,593,834 | McNeal et al. | July 27, 1926 |
| 1,820,635 | Strickland | Aug. 25, 1931 |
| 1,833,829 | Doolin | Nov. 24, 1931 |
| 2,462,956 | Gross | Mar. 1, 1949 |
| 2,476,531 | Berg | July 19, 1949 |
| 2,510,591 | Listman | June 6, 1950 |